US008359938B2

(12) United States Patent
Gumpoltsberger et al.

(10) Patent No.: US 8,359,938 B2
(45) Date of Patent: Jan. 29, 2013

(54) DUAL CLUTCH TRANSMISSION

(75) Inventors: Gerhard Gumpoltsberger, Friedrichshafen (DE); Juergen Wafzig, Eriskirch (DE); Matthias Reisch, Ravensburg (DE); Wolfgang Rieger, Friedrichshafen (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 433 days.

(21) Appl. No.: 12/681,920

(22) PCT Filed: Oct. 8, 2008

(86) PCT No.: PCT/EP2008/063427
§ 371 (c)(1),
(2), (4) Date: Apr. 7, 2010

(87) PCT Pub. No.: WO2009/050075
PCT Pub. Date: Apr. 23, 2009

(65) Prior Publication Data
US 2010/0206106 A1    Aug. 19, 2010

(30) Foreign Application Priority Data
Oct. 15, 2007 (DE) .................... 10 2007 049 263

(51) Int. Cl.
*F16H 3/08* (2006.01)
(52) U.S. Cl. .......................................... 74/330
(58) Field of Classification Search .............. 74/330, 74/333, 340
See application file for complete search history.

(56) References Cited

U.S. PATENT DOCUMENTS

| | | | |
|---|---|---|---|
| 6,244,123 B1 | 6/2001 | Hegerath et al. | |
| 6,869,379 B2* | 3/2005 | Voss et al. | 475/218 |
| 7,066,043 B2* | 6/2006 | Kim et al. | 74/330 |
| 7,225,696 B2* | 6/2007 | Gitt | 74/340 |
| 7,246,536 B2 | 7/2007 | Baldwin | |
| 7,287,442 B2 | 10/2007 | Gumpoltsberger | |
| 7,597,644 B2* | 10/2009 | Rodgers, II | 475/218 |
| 7,604,561 B2* | 10/2009 | Earhart | 475/218 |

(Continued)

FOREIGN PATENT DOCUMENTS

| | | |
|---|---|---|
| DE | 38 22 330 A1 | 7/1989 |
| DE | 102 39 540 A1 | 3/2004 |

(Continued)

OTHER PUBLICATIONS

Prof. Dr. P. Tenberge; "Doppelkupplungsgetriebe in Planetenradbauweise Getriebestrukturen zwischen Automatik-und Doppelkupplungsgetrieben" Wissenportal baumaschine de Mar. 2007.

*Primary Examiner* — Ha D. Ho
(74) *Attorney, Agent, or Firm* — Davis & Bujold, PLLC (57) ABSTRACT

A double clutch transmission with two clutches connected to a drive shaft and to one of two transmission input shafts. Fixed gears are coupled to the input shafts and engage idler gears. Several coupling devices connect the idler gears to a countershaft which have an output gear that couple gears of an output shaft such power shift forward gears and a reverse gear can be shifted. Three dual gear planes each comprising one fixed gear which is supported by an input shaft and two idler gears which are supported by a respective countershaft. In each dual gear plane at least one idler gear wheel can be used for at least two gears such that at least one winding-path gear is engaged by engagement of a disengaged output coupling device assigned to one of the output gear wheels.

24 Claims, 8 Drawing Sheets

U.S. PATENT DOCUMENTS

| | | | |
|---|---|---|---|
| 7,604,565 B2 * | 10/2009 | Lee et al. | 477/3 |
| 8,051,732 B2 * | 11/2011 | Gitt | 74/331 |
| 2006/0054441 A1 | 3/2006 | Ruedle | |
| 2009/0036247 A1 * | 2/2009 | Earhart et al. | 475/35 |

FOREIGN PATENT DOCUMENTS

| | | |
|---|---|---|
| DE | 103 05 241 A1 | 9/2004 |
| DE | 10 2004 001 961 A1 | 8/2005 |
| DE | 10 2004 012 909 A1 | 10/2005 |
| DE | 10 2005 028 532 A1 | 12/2006 |
| DE | 10 2005 045 005 A1 | 3/2007 |
| FR | 2 880 088 A1 | 6/2006 |
| GB | 2 424 250 A | 9/2006 |
| WO | 2005/068875 A3 | 7/2005 |
| WO | 2005/093289 A1 | 10/2005 |

* cited by examiner

Fig. 1

| G | ZS | K1 | K2 | A | B | C | D | E | F | I | K | S_ab1 | S_ab2 |
|---|---|---|---|---|---|---|---|---|---|---|---|---|---|
| G1 | i_3·i_4·i_2 |  | 1 | 1 |  | 1 |  |  |  |  |  |  | 1 |
| G2 | i_2 | 1 |  |  |  |  |  | 1 |  |  |  |  | 1 | 1 |
| G3 | i_3 | 1 | 1 | 1 |  |  |  |  |  |  |  |  | 1 | 1 |
| G4 | i_4 |  |  |  |  | 1 |  | 1 |  |  |  |  | 1 | 1 |
| G5 | i_5 |  | 1 |  |  |  | 1 |  |  |  |  |  | 1 | 1 |
| G6 | i_6 | 1 |  |  |  |  |  |  |  | 1 |  |  | 1 | 1 |
| G7 | i_4·i_3·i_5 | 1 |  | 1 |  | 1 |  |  |  | 1 |  |  |  | 1 |
| R– GEAR |
| R1 | i_R | 1 |  |  | 1 |  |  |  |  |  |  |  | 1 | 1 |
| R2 | i_5·i_6·i_R |  | 1 |  | 1 |  |  |  |  |  |  |  | 1 | 1 |
| SLOW SPEED GEAR |
| C1 | i_2·i_5·i_3 | 1 |  | 1 |  |  |  |  |  |  |  | 1 | 1 | 1 |
| OVERDRIVE GEAR |
| O1 | i_5·i_2·i_4 |  | 1 |  |  | 1 |  |  |  |  |  | 1 | 1 | 1 |

| G | ZS | K1 | K2 | A | B | C | D | E | F | I | K | S_ab1 | S_ab2 |
|---|---|---|---|---|---|---|---|---|---|---|---|---|---|
| G1 | $i\_3 \cdot i\_4 \cdot i\_2$ |   |   | 1 |   |   |   |   |   |   |   |   | 1 |
| G2 | $i\_2$ | 1 |   |   | 1 |   |   |   |   |   |   | 1 | 1 |
| G3 | $i\_3$ |   | 1 | 1 |   |   |   |   |   |   |   | 1 | 1 |
| G4 | $i\_4$ | 1 |   |   |   |   |   | 1 |   |   |   | 1 | 1 |
| G5 | $i\_5$ |   | 1 |   |   | 1 |   |   |   |   |   | 1 | 1 |
| G6 | $i\_6$ | 1 |   |   |   |   | 1 |   |   |   |   | 1 | 1 |
| G7 | $i\_5 \cdot i\_2 \cdot i\_4$ |   | 1 |   |   | 1 |   |   | 1 |   |   |   | 1 |

R- GEAR

| | ZS | K1 | K2 | A | B | C | D | E | F | I | K | S_ab1 | S_ab2 |
|---|---|---|---|---|---|---|---|---|---|---|---|---|---|
| R1 | $i\_R$ | 1 |   |   | 1 |   |   |   |   |   |   | 1 | 1 |
| R2 | $i\_5 \cdot i\_6 \cdot i\_R$ |   |   |   | 1 |   |   |   | 1 |   |   |   |   |

SLOW SPEED GEAR

| | ZS | K1 | K2 | A | B | C | D | E | F | I | K | S_ab1 | S_ab2 |
|---|---|---|---|---|---|---|---|---|---|---|---|---|---|
| C1 | $i\_2 \cdot i\_5 \cdot i\_3$ | 1 |   | 1 |   |   | 1 |   |   |   | 1 |   | 1 |

| G | ZS | K1 | K2 | A | B | C | D | E | F | I | K | S_ab1 | S_ab2 |
|---|---|---|---|---|---|---|---|---|---|---|---|---|---|
| G1 | i_3_i_4_i_2 | | 1 | | | | | | | | | 1 | 1 |
| G2 | i_2 | 1 | | | | | | | 1 | | | 1 | 1 |
| G3 | i_3 | 1 | 1 | | | | | | | | | 1 | 1 |
| G4 | i_4 | | | | | | | 1 | | | | 1 | 1 |
| G5 | i_5 | | 1 | 1 | | | | | | | | 1 | 1 |
| G6 | i_6 | 1 | | | 1 | | | | | | | 1 | 1 |
| G7 | i_4_i_3_i_5 | 1 | | 1 | | | | | | | | 1 | 1 |
| R− GEAR | | | | | | | | | | | | | |
| R1 | i_R_i_5_i_3 | 1 | | | | 1 | 1 | | | | | | 1 |
| OVERDRIVE GEAR | | | | | | | | | | | | | |
| O1 | i_3_i_2_i_6 | | 1 | | | 1 | 1 | | 1 | | | 1 | |

| G | ZS | K1 | K2 | A | B | C | D | E | F | I | K | S_ab2 |
|---|---|---|---|---|---|---|---|---|---|---|---|---|
| G1 | i_3·i_4·i_2 |  | 1 |  |  |  |  |  | 1 | 1 |  | 1 |
| G2 | i_2 | 1 |  |  |  |  |  |  | 1 |  |  | 1 |
| G3 | i_3 | 1 | 1 | 1 |  |  |  |  |  |  |  | 1 |
| G4 | i_4 | 1 | 1 |  | 1 |  |  |  |  |  |  | 1 |
| G5 | i_5 |  | 1 |  |  |  | 1 |  |  |  |  | 1 |
| G6 | i_6 | 1 |  |  |  |  |  | 1 |  |  |  | 1 |
| G7 | i_5·i_2·i_4 |  | 1 |  | 1 |  | 1 |  | 1 |  |  |  |

R– GEAR

| G | ZS | K1 | K2 | A | B | C | D | E | F | I | K | S_ab2 |
|---|---|---|---|---|---|---|---|---|---|---|---|---|
| R1 | i_R | 1 |  |  |  | 1 |  |  |  |  |  | 1 |
| R2 | i_3·i_4·i_R |  | 1 |  |  | 1 |  |  |  | 1 |  | 1 |
| R3 | i_5·i_6·i_R |  | 1 |  |  | 1 |  |  |  |  | 1 | 1 |

SLOW SPEED GEAR

| G | ZS | K1 | K2 | A | B | C | D | E | F | I | K | S_ab2 |
|---|---|---|---|---|---|---|---|---|---|---|---|---|
| C1 | i_2·i_5·i_3 | 1 |  | 1 |  |  |  |  | 1 |  |  |  | ated condition the respective output gear wheel is disengaged from the assigned countershaft. In a non-operated condition or long activated condition the coupling device, assigned to an output gearwheel, is engaged so that the respective output gear wheel is connected with the assigned countershaft in a rotationally fixed manner.
DUAL CLUTCH TRANSMISSION This application is a National Stage completion of PCT/EP2008/063427 filed Oct. 8, 2008, which claims priority from German patent application serial no. 10 2007 049 263.6 filed Oct. 15, 2007.

FIELD OF THE INVENTION

The present invention relates to a double clutch transmission for a motor vehicle.

BACKGROUND OF THE INVENTION

Known from the publication DE 103 05 241 A1 is a 6-speed or 7-speed double clutch transmission. The double clutch transmission comprises two clutches, each connected with their inputs to the drive shaft and their output to one of the two transmission input shafts. The two transmission input shafts are coaxially positioned towards each other. In addition, two countershafts are axially parallel to the transmission input shafts, their idler gear wheels mesh with the fixed gear wheels of the transmission input shafts. Furthermore, coupling devices, that are axially movable, are connected in a rotationally fixed manner to the countershaft to shift the respective gear wheels. Each selected ratio is transferred by the drive gear wheels to a differential transmission. To achieve the desired gear ratio steps in this known double clutch transmission, a vast number of wheel planes are required, and a significant amount of installation space is needed.

In addition, a spur gear change speed transmission is known from the publication DE 38 22 330 A1. The spur gear change speed transmission comprises a double clutch, which is switchable under power, where one part is connected with a drive shaft and the other part with a hollow drive shaft, rotatably positioned on the drive shaft. For certain gear ratios, the drive shaft can be coupled with the hollow drive shaft through a shifting device.

Known from the publication DE 10 2004 001 961 A1 is a power shift transmission with two clutches, each of which are assigned to a partial transmission. The transmission input shafts of the two partial transmissions are coaxially positioned to each other and mesh, through fixed gearwheels, with idler gear wheels of the designated countershaft. The respective idler gear wheels of the countershafts can be connected, in a rotationally fixed manner, with the respective countershaft through designated shifting devices. The particular idle wheels of the countershaft can be connected in a rotationally fixed manner by the assigned shifting devices with the associated countershaft. A 7-gear transmission, among other things, is known through this publication in which an additional shift element is provided to connect the two transmissions input shafts to establish an additional transmission stage. The 7-gear transmission requires in this embodiment at least six wheel planes in the two partial transmissions, to achieve the transmission stages. This causes an unwanted extension of the construction length in axial direction, It therefore significantly limits use in a motor vehicle.

SUMMARY OF THE INVENTION

It is the task of the present invention to propose a dual clutch transmission based on the previously described type, in which power shift engaging gear ratio steps can be realized, cost-efficiently and with just a few component parts, which need a reduced amount of installation space.

Thus, a double clutch transmission with two clutches, optimized for needed installation space, is proposed, in which the inputs are connected with a drive shaft and the outputs are each connected with one of two coaxial transmission input shafts. The double clutch transmission comprises at least two countershafts, on which gear wheels, designed as idler gear wheels, are rotatably positioned, and on the two transmissions input shafts are gear wheels connected in a rotationally fixed manner and designed as fixed wheels, which at least partially mesh with the idler gear wheels. In addition, several coupling devices, or similar, are provided for a rotationally fixed connection of an idler gear wheel with a countershaft. The double clutch transmission, in accordance with the invention, has one output gear wheel, or constant pinion supported on each of the two countershafts, and each of which are coupled with gears of a drive shaft, to connect the respective countershaft with the output, whereby several power shift forward gears and at least one reverse gear can be shifted.

In this invention, just three dual gear planes are preferably provided, in each of which an idler gear wheel on the countershaft is assigned to a fixed gear wheel of one of the transmission input shafts and in each dual gear plane at least one idler gear wheel can be used for at least two gear positions, such that at least one winding-path gear can be shifted via at least one disengaged coupling device, that is assigned to one of the output gear wheels, in which, in the disengaged or activated condition the respective output gear wheel is disengaged from the assigned countershaft. In a non-operated condition or long activated condition the coupling device, assigned to an output gearwheel, is engaged so that the respective output gear wheel is connected with the assigned countershaft in a rotationally fixed manner.

Due to the possible multi-use of the idler gear wheels, the proposed double clutch transmission enables a maximum number of gear ratios with as few gear planes as possible, whereby preferably all forward gears and all reverse gears are sequentially power shiftable.

Advantageously, up to four shifting devices can be used for each countershaft, which can be realized through shifting devices and/or coupling devices, and a maxim of two activating devices on each countershaft, if necessary. To better adapt the gearing steps, the invented double clutch transmission can provide that for instance a drive pinion or an output gear wheel on a countershaft can be shifted such that more winding-path gears become available, as compared to the use of one shifting device.

The invented and presented double clutch transmission can preferably be designed as a 7-gear transmission. Due to the shortened design, as compared to known transmission designs, the invented double clutch transmission is especially applicable in a front-transverse constructions. However, other constructions are also possible, and depend on the design and the available construction of the respective motor vehicle.

Within the scope of a possible, first embodiment of this invention, it can be provided that by disengaging the coupling device on the first countershaft, the associated output gear wheel becomes decoupled from the first countershaft, so that the first forward gear and the seventh forward gear can be shifted as a winding-path gear. Hereby, the first forward gear as well as the seventh forward gear can be realized, among other options, through the gear steps of the third and the fourth forward gear, in a manner such that just three connections or coupling devices are required on the second countershaft.

In accordance with a second, possible embodiment of the invention, the first forward gear can be shifted by a disengaged coupling device on the first countershaft, by means of an additional, activating or engaging shifting device, an idler gear wheel on the second countershaft of the second partial transmission can be connected with an idler gear wheel of the first partial transmission, so that the seventh forward gear can be shifted as a winding-path gear. Hereby, the first forward gear as well as the seventh forward gear can be realized, among other options, via the gear wheel steps of the second and the fourth forward gear. With the additional shifting device in this embodiment, a low speed gear can also be shifted as a winding-path gear and for the seventh forward gear and the low speed gear, only two device shift points have to be activated, those being the shifting device and a coupling device on the second countershaft.

Also, the third embodiment of this invention can provide that, beside the disengaged coupling device on the first countershaft, an additional shifting device is provided, to shift a reverse gear as a winding-path gear, for instance on the second countershaft to connect an idler gear wheel of the second partial transmission with an idler gear wheel of the first partial transmission, by means of which the first forward gear as well as the seventh forward gear can be shifted as a winding-path gear. Hereby, the first forward gear can be realized and the seventh forward gear, via the gear wheel steps of the third and the fourth forward gears. Also, this embodiment can provide that the gear wheel steps for the second, third, and fourth forward gears are positioned on the second countershaft, whereby advantages with regard to the gearing configuration, the bearing of the shaft and the shaft design.

Within the scope of the fourth embodiment, contrary to the previous embodiments, an additional shifting device on the first countershaft can be provided, which connects an idler gear wheel of the second partial transmission with an idler gear wheel of the first partial transmission, so that a first forward gear and a reverse gear can be shifted as a winding-path gear. Hereby, the first forward gear, as well as the reverse gear, can be realized through the gear wheel steps of the third and the fourth forward gear. Independent of the respective embodiment, a shifting device for the connection of two gear wheels can be a claw clutch or similar.

In this invented double clutch transmission, the winding-path gears can be realized at least through the one shifting device and/or the disengaged coupling device, in which the gear wheels of both partial transmissions are coupled with each other, to enable the flow of force through both partial transmissions. The respective shifting devices serve hereby for the coupling of two idler gear wheels and creates intercoupling of the transmission input shafts to each other such that in contrast, the respective, used coupling devices separated the associated countershaft from the output stage at one of the output gear wheels, if the used coupling device is disengaged. Due to the fact of having at least one shiftable output gear wheel on one of the countershafts, more winding-path gears can be realized, as compared to using just one shift element, also the gear step can be better matched.

The positioning of the shifting devices to connect two defined idler gear wheels, independently of each embodiment of the double clutch transmission, can vary, so that the shifting devices do not have to be necessarily positioned between the idler gear wheels being connected. Thus, other position designs of each shifting device are conceivable to optimize the connectage to an actuating device.

The invented double clutch transmission can provide that the first dual gear plane comprises a fixed gear wheel on the second transmission input shaft of the second partial transmission, and the second and third dual gear planes comprise two fixed gear wheels on the first transmission input shaft of the first partial transmission. Hereby, independent of the respective embodiment, each of the three fixed gear wheels of the transmission input shafts can be used at least for two gears. However, other embodiments are also possible. For instance, it can be provided in a configuration of the different gear wheel steps, that the gear wheel steps for the fourth and the sixth power shift forward gears are located in one gear plane. Also the gear wheel steps of the second power shiftable forward gear and at least one reverse gear, can also be positioned in one gear plane. Just three idler gear wheels, in an advantageous way, are needed on a countershaft, which mesh with the fixed gear wheels on the transmission input shaft, and just two idler gear wheels on the other countershaft are needed, which also mesh with fixed gear wheels on the transmission input shafts.

To realize the reverse gears in the invented double clutch transmission, an intermediate gear can be used which is positioned on an intermediate shaft. It is also possible that one of the idler gear wheels on a countershaft serves as intermediate gear wheel for at least one reverse gear. In this case, no additional intermediate shaft is necessary for the reverse gearing, because one of the idler gear wheels meshes with a fixed gear wheel and with an additional, shiftable idler gear wheel on the countershaft. Hence, the required intermediate gear for the reverse gear is positioned as a shiftable idler gear wheel on a countershaft and is utilized for at least one additional forward gear. The intermediate gear wheel can always be designed as a step gear regardless of whether it is positioned on a countershaft or on an additional intermediate shaft.

To obtain the desired transmission gear steps, it can be provided in this invented double clutch transmission, that on each countershaft, at least one dual action coupling device or similar is established as shifting locations. The coupling devices can, in the activated or engaged condition and depending on the direction of operation, connect an associated idler gear wheel in a rotationally fixed manner with the countershaft. In addition, a single action coupling device or similar can be established on at least one countershaft as a shifting location. Clutches, operating on a hydraulic, electric, pneumatic, or mechanical basis, or also interlocking claw clutches, as well as any kind of synchronization devices can be applied and which serve for the rotationally fixed connection of an idler gear wheel with a countershaft. It is also possible that a single action coupling device is replaced by two single action coupling devices and vice versa.

It is possible that the mentioned options for positioning the gear wheels vary, and also the number of gear wheels and the number of coupling devices are altered to realize additional power shift and non-power shift gears, for further reduction of installation space and component cost for this invented double clutch transmission. Especially fixed wheels of dual wheel planes can be split into two fixed wheels for two single wheel planes. Such that the shifting can be improved. It is also possible, to swap the countershafts. The partial transmissions can also be swapped, meaning mirror imaged around a vertical axle. Hereby, the hollow shaft and the solid shaft are swapped. It is possible to position the smallest gear wheel on the solid shaft to further optimize the use of the available installation space. In addition, neighboring wheel planes can be swapped, to optimize, for example, deflection of the shaft and/or the connecting of a shifting actuator device. Also, the respective mounting position of the coupling devices on the wheel plane can be varied. In addition, also the direction of action of the coupling devices can be varied.

The numbering used herein is freely defined. It is also possible to add a low speed gear, to improve the off road characteristics or the acceleration performance of a motor vehicle. In addition, the first gear can be left out to better optimize the entirety of the gear steps. The numbering of the gears varies through these measures accordingly.

Independent of the respective embodiments of the double clutch transmission, the drive shaft and the output shaft can be positioned non-coaxially to each other, which enables an especially space saving configuration. For instance, the shafts which are spatially positioned one after another, can also present a slight offset to each other. In that configuration, a direct gear with the transmission ratio of one can be realized by teeth engagement and can be shifted, relatively freely, to the fourth, fifth, or sixth gears. A different configuration option of the drive shaft and the output shaft is also possible.

The proposed double clutch transmission is preferably equipped with an integrated output stage. The output stage can comprise a fixed gear wheel on the output shaft as an output gear wheel, which meshes with the first output gear wheel on the first countershaft, and with a second output gear wheel on the second countershaft. Depending on the embodiment, at least one of the output gear wheels is designed to be a gear wheel shifted by a coupling device.

Advantageously, the lower forward gears and the reverse gears can be activated through a startin, or shifting clutch to hereby focus higher loads on this clutch and to construct the second clutch with less need for space and more cost-effectively. Especially, the wheel planes in the proposed double clutch transmission can be positioned in a way that one can start, through the inner transmission input shaft or through the outer transmission input shaft such that starting occurs by way of the more appropriate clutch, which is also possible in a concentrically positioned, radial nestedconstruction of the double clutch. Accordingly, the wheel planes can be positioned as mirror-symmetric, or swapped, respectively. It is also possible that the countershafts are swapped or positioned as in a mirror image.

Independent of the respective embodiments, for instance, the provided wheel planes of the double clutch transmission can be swapped. It is also possible, to use instead of a dual wheel plane two single wheel planes and/or vice versa. In addition, the two partial transmissions can be positioned as in mirror image.

BRIEF DESCRIPTION OF THE DRAWINGS

Following, the present invention is further explained based on the drawings. It shows.

DETAILED DESCRIPTION OF THE PREFERRED EMBODIMENTS

FIGS. 1, 3, 5, and 7 each show a possible embodiment of a 7-gear double clutch transmission. The respective shifting schemes, relating to the embodiments, are presented accordingly as tables in the FIGS. 2, 4, 6, and 8.

The 7-gear double clutch transmission comprises, regardless of the respective embodiments, two clutches, K1, K2, in which the input sides are connected to a drive shaft w_an, and the output sides are each connected with one of the two, coaxially arranged, transmission input shafts w_K1, w_K2. Also, a torsion vibration damper 14 can be positioned at the drive shaft w_an. In addition, two countershafts w_v1, w_v2 are provided, on which gear wheels are rotatably positioned and designed as idler gear wheel 5, 6, 7, 8, 9, 10. On the two transmission input shafts w_K1, w_K2, gear wheels are connected in a rotationally fixed manner and designed as fixed wheels 1, 2, 3 which at least partially mesh with the idler gear wheels 5, 6, 7, 8, 9, 10.

Several activating coupling devices A, B, C. D, E, F are provided on the countershafts w_v1, w_v2 to connect the idler gear wheels 5, 6, 7, 8, 9, 10 with the respective countershaft w_v1, w_v2. In addition output gear wheels 12, 13 are positioned on the two countershafts w_v1, w_v2, and designed as constant pinions and are each coupled with the gearing of an output shaft w_ab.

Only three dual gear planes 5-8, 6-9, 7-10 are provided in the inventive double clutch transmission, and each idler gear wheel 5, 8; 6, 9; 7, 10 on the countershafts w_v1, w_v2 is assigned to a fixed wheel 1, 2, 3 on one of the transmission input shafts w_K1, w_K2, such that in each dual gear plane 5-8, 6-9, 7-10, at least one idler gear wheel 5, 6, 7, 8, 9, 10 can be used at least for two gear positions, so that at least one winding-path gear can be shifted at least via one coupling device S_ab1, S_ab2, assigned to the output gear wheels 12, 13 and disengaged.

Thus, besides the coupling devices A, B, C, D, E, F which connect a gear wheel and the associated countershaft w_v1, w_v2 in a rotationally fixed manner, the double clutch transmission has at least one coupling device S_ab1, S_ab2, assigned to the output gear wheels 12, 13, on one of the countershafts w_v1, w_v2, which is disengaged when shifting a winding-path gear, to disconnect the respective output gear 12, 13 from the assigned countershaft w_v1, w_v2.

Independent from the embodiments, the three dual gear planes 5-8, 6-9, 7-10 comprise two fixed gear wheels 2, 3 on the first transmission input shaft w_K1 and a fixed gear wheel 1 on the second transmission input shaft w_K2, and three idler gear wheels 5, 6, 7, 8, 9, 10 on the two countershafts w_v1, w_v2.

Figure 1:
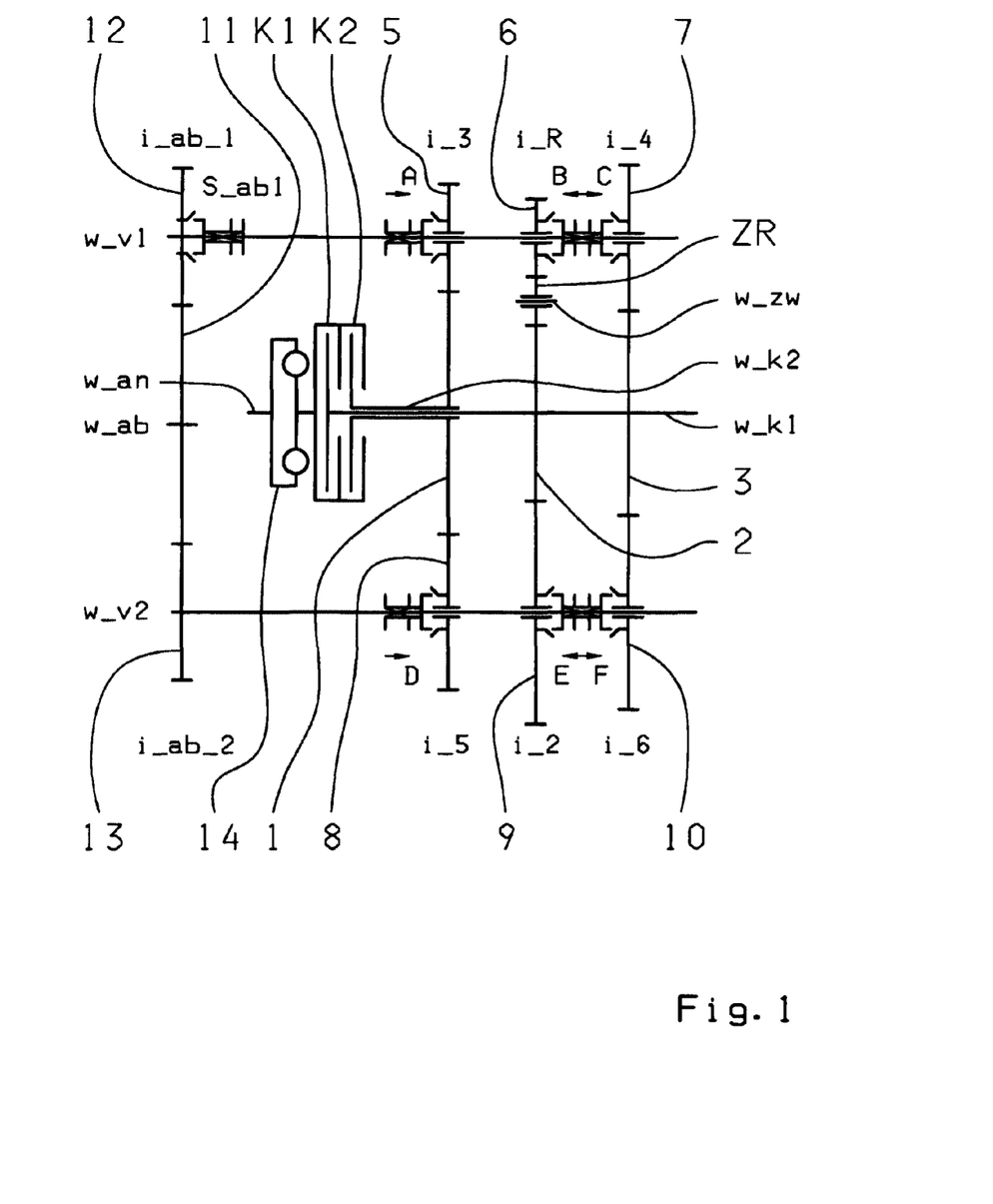
FIG. 1 a schematic view of a first embodiment of an inventive 7-gear double clutch transmission.
Figure 2:
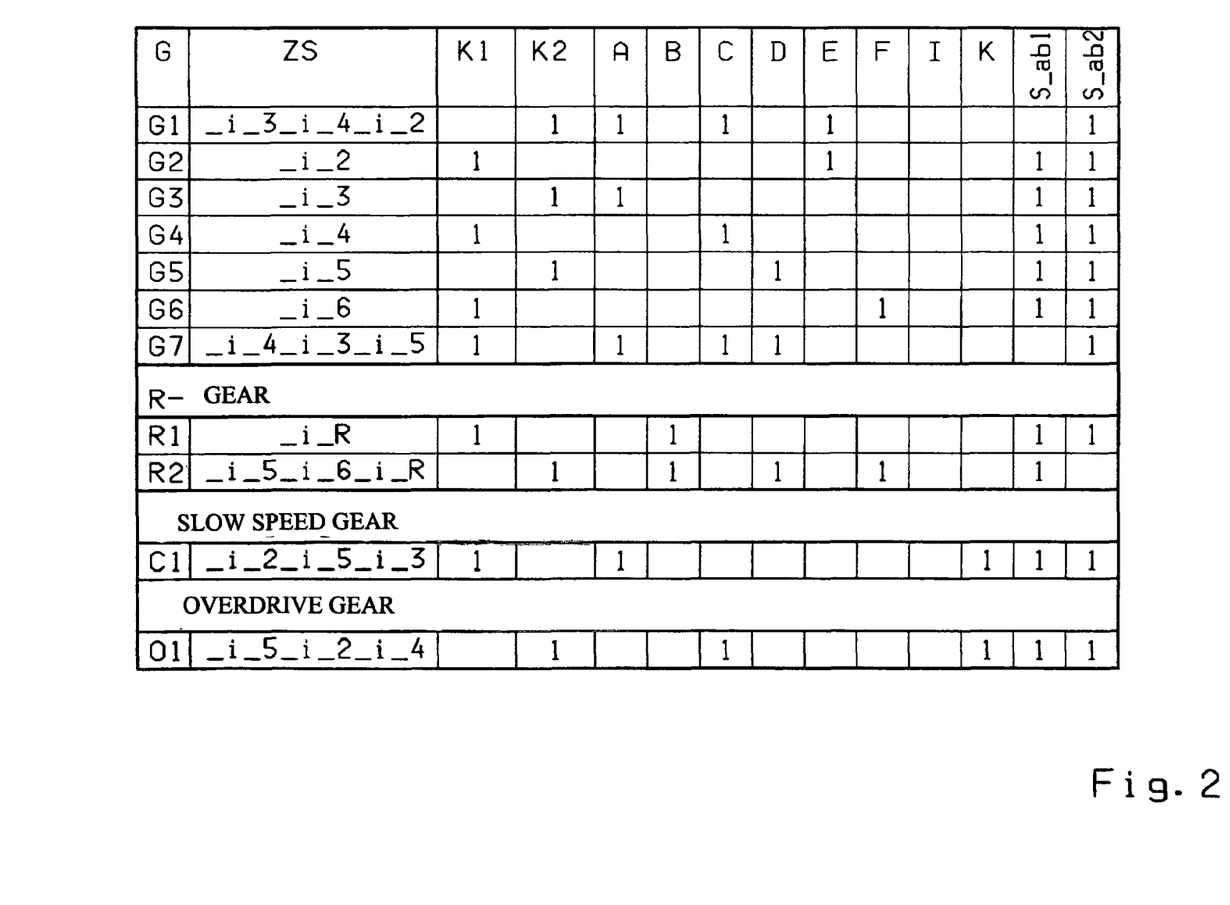
FIG. 2 a shift scheme of the first embodiment in accordance with FIG. 1.

In the first embodiment of the double clutch transmission, in accordance with FIGS. 1 and 2, the output gear wheel 12 is decoupled from the first countershaft w_v1 when the coupling device S_ab1 is disengaged, so that the first forward gear G1 and the seventh forward gear G7 can be shifted as winding-path gears.

Figure 3:
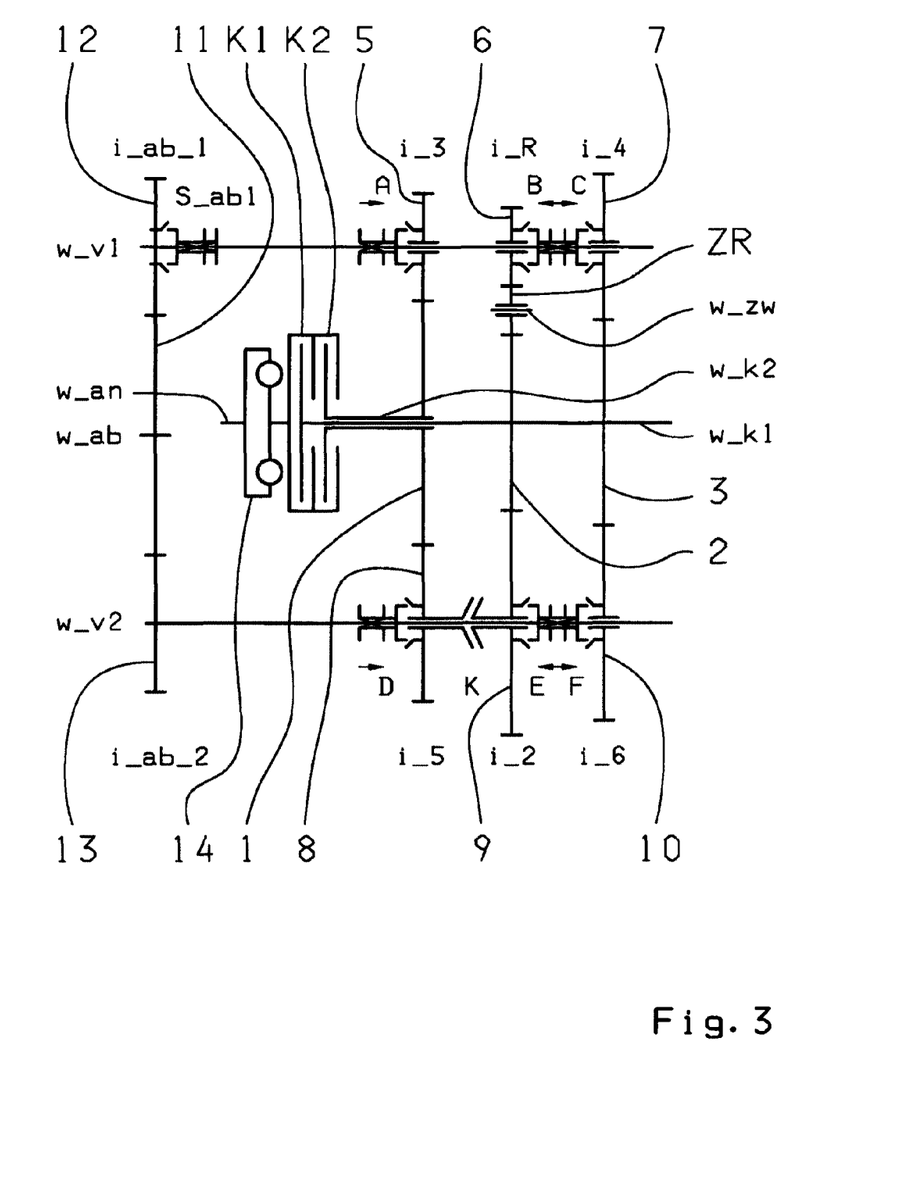
FIG. 3 a schematic view of a second embodiment of the inventive 7-gear double clutch transmission.
Figure 4:
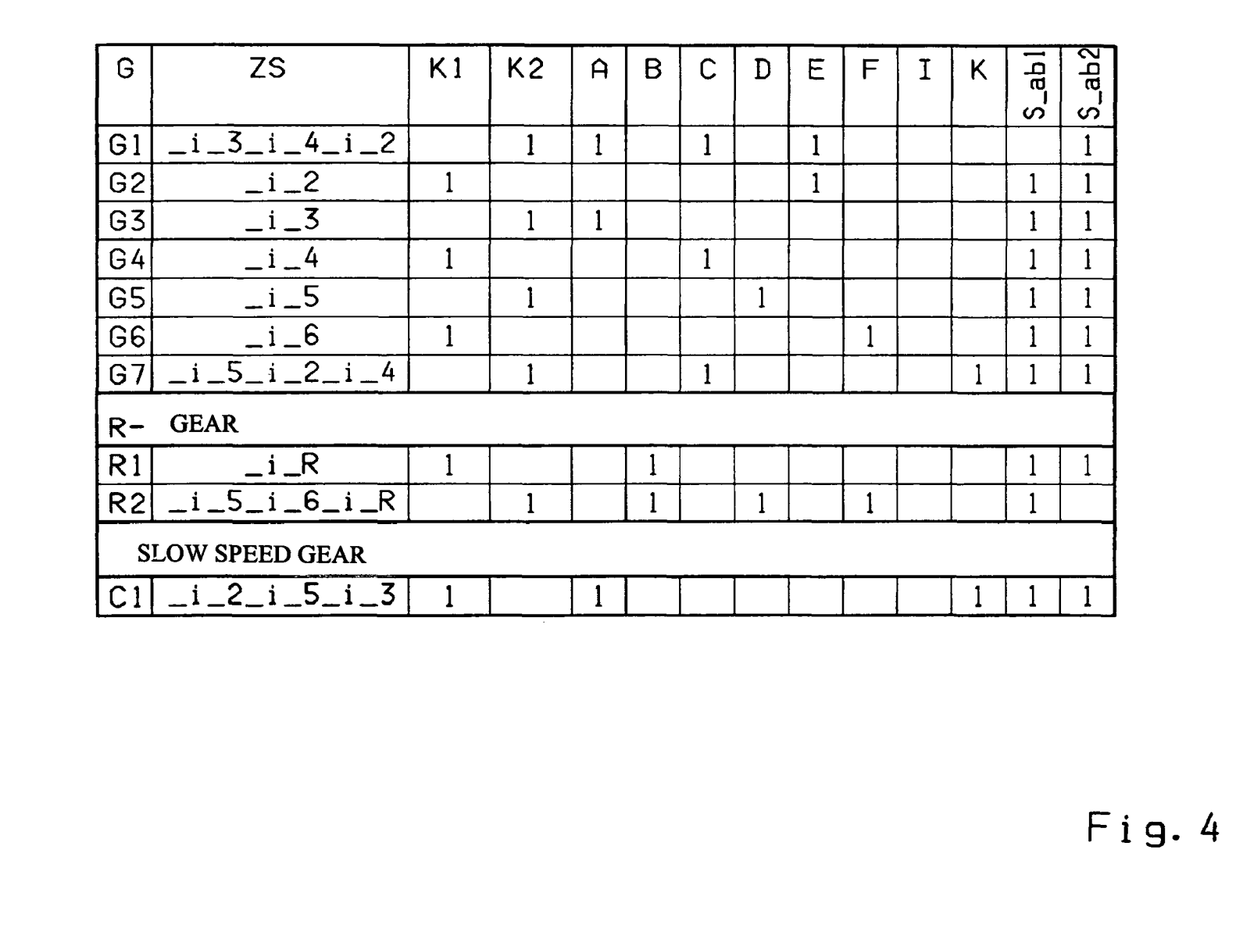
FIG. 4 a shift scheme of the second embodiment in accordance with FIG. 3.

The second embodiment of the double clutch transmission, in accordance with FIGS. 3 and 4 illustrates that the output gear wheel 12 is decoupled from the first countershaft w_v1 when the coupling device S_ab1 is disengaged, such that the first forward gear G1 can be shifted as a winding-path gear, and that, at least via one additional shifting device K on the second countershaft w_v2, the idler gear wheel 8 of the second partial transmission is connected with the idler gear wheel 9 of the first partial transmission and, via the shifting device K, the seventh forward gear G7 is shifted as a winding-path gear.

Figure 5:
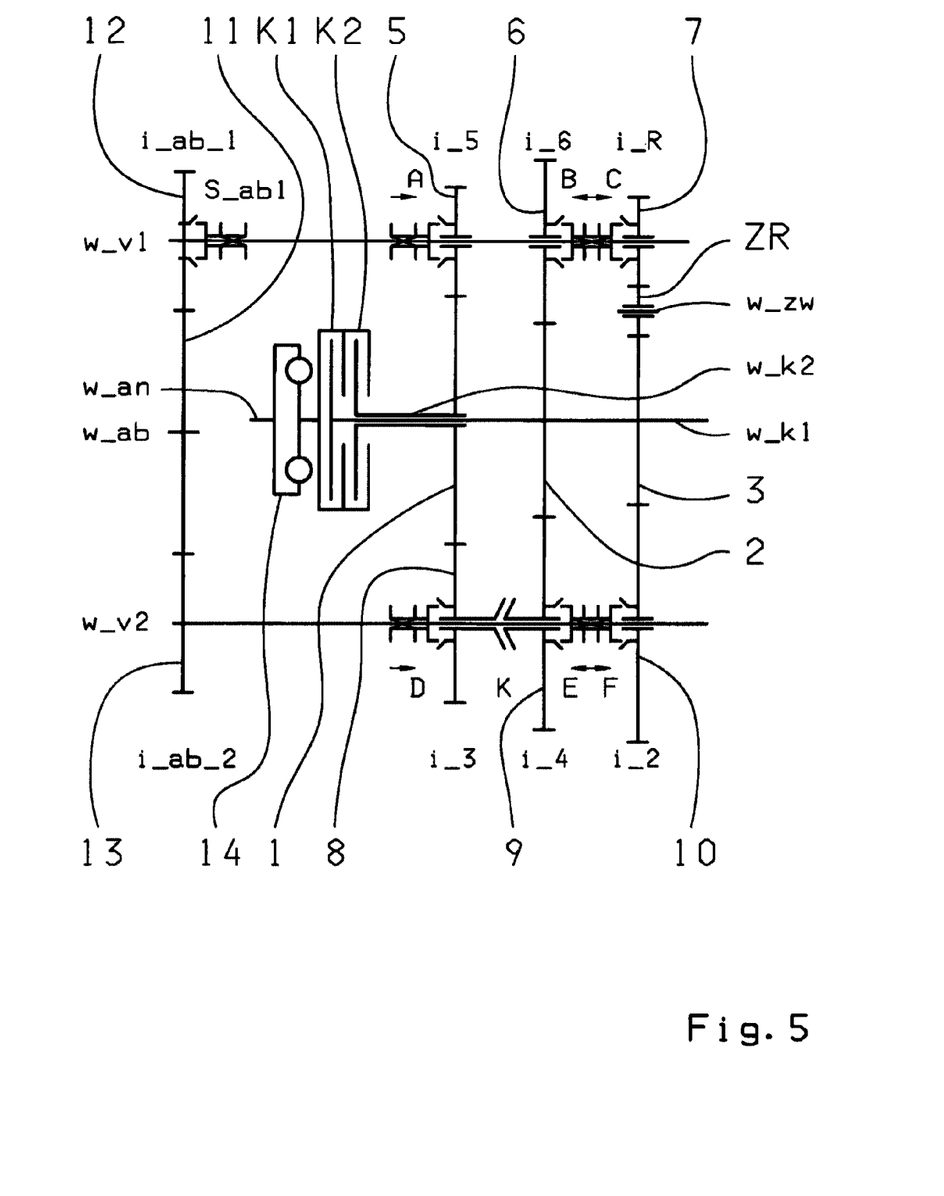
FIG. 5 a schematic view of a third embodiment of the inventive 7-gear double clutch transmission.
Figure 6:
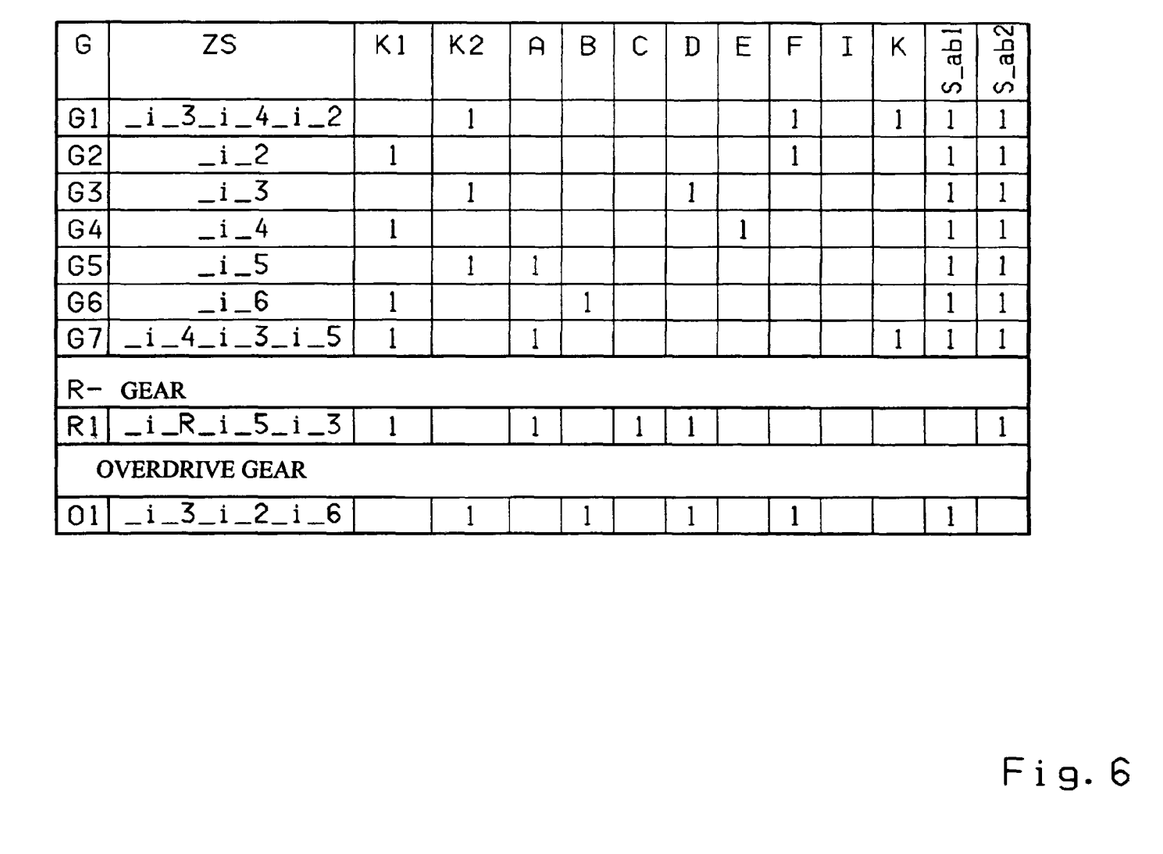
FIG. 6 a shift scheme of the third embodiment in accordance with FIG. 5.

Also, in the third embodiment, in accordance with FIGS. 5 and 6, the double clutch transmission comprises at least one additional shifting device K on the second countershaft w_k2 and the assigned coupling device S_ab1 which is assigned to the output gear wheel 12. Contrary to the previous embodiments, the first forward gear G1 and the seventh forward gear G7 can be shifted via the shifting device K and a reverse gear R1 can be shifted as a winding-path gear when the coupling device S_ab1 is engaged.

Figure 7:
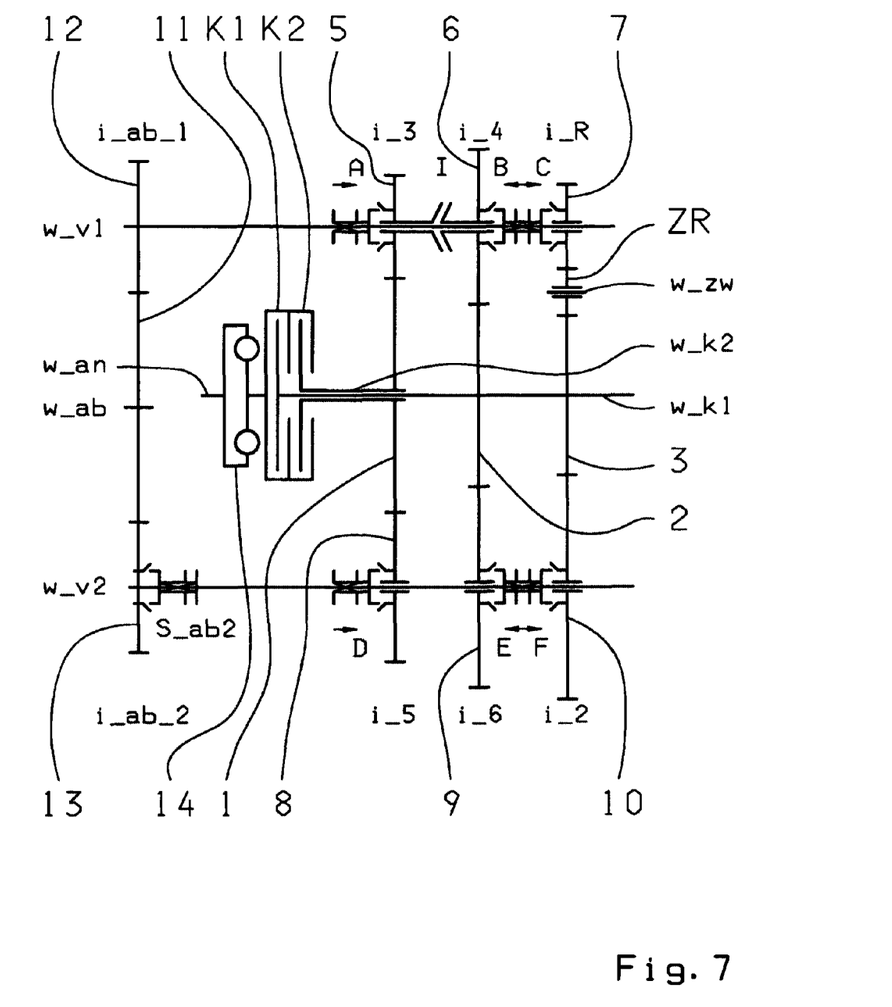
FIG. 7 a schematic view of the fourth embodiment of the inventive 7-gear double clutch transmission.

In accordance with FIG. 7, the fourth embodiment provides that, via an additional shifting device I on the first countershaft w_v1, the idler gear wheel 5 of the second partial transmission can be connected with the idler gear wheel 6 of the first partial transmission, so that via the shifting device I the first forward gear G1 and a reverse gear (R2) can be shifted as a winding-path gear. In addition and contrary to the previous embodiments, a coupling device S_ab2 on the second countershaft (w_v2), assigned to the output gear wheel 13, is provided, to decouple, when disengaged, the output gear wheel 13 from the second countershaft (w_v2), so that a seventh forward gear (G7) can be shifted as a winding-path gear.

In the first embodiment, in accordance with FIG. 1, and in the second embodiment, in accordance with FIG. 3, in the first dual gear plane 5-8 the fixed gear wheel 1 on the second transmission input shaft w_K2, meshes with the idler gear wheel 5 on the first countershaft w_v1, and with the idler gear wheel 8 on the second countershaft w_v2. In the second dual gear plane 6-9, the fixed gear wheel 2 on the first transmission input shaft w_K1 meshes with the idler gear wheel 9 on the second countershaft w_v2, and with an intermediate gear wheel ZR, the intermediate gear wheel ZR enables the reversal of rotation for a reverse gear R1, R2. The intermediate gear ZR is rotatably positioned on the intermediate shaft w_zw and the intermediate shaft w_zw, in this example, is positioned in parallel with the countershafts w_v1, w_v2. The intermediate gear wheel ZR also meshes with the idler gear wheel 6 on the first countershaft w_v1. Finally, in the third dual gear plane 7-10, the fixed gear wheel 3 of the first transmission input shaft w_K1 meshes with the idler gear wheel 7 on the first countershaft w_v1, and with the idler gear wheel wheel 10 on the second countershaft w_v2.

In the third and fourth embodiments, in accordance with the FIGS. 5 and 7, in the first dual gear plane 5-8 the fixed gear wheel 1 on the second transmission input shaft w_K2, meshes with the idler gear wheel 5 on the first countershaft w_v1, and with the idler gear wheel 8 on the second countershaft w_v2. In the second dual gear plane 6-9, the fixed gear wheel 2 on the first transmission input shaft w_K1 meshes with the idler gear wheel 9 on the second countershaft w_v2, and with the idler gear wheel 6 on the first countershaft w_v1. Finally, in the third dual gear plane 7-10, the fixed gear wheel 3 on the first transmission input shaft w_K1 meshes with the idler gear wheel 10 on the second countershaft w_v2, and with an intermediate gear wheel ZR, the intermediate gear wheel ZR enables the reversal of rotation for the reverse gear R1. The intermediate gear wheel ZR is rotatably positioned on an intermediate shaft w_zw and the intermediate shaft w_zw, in this example, is positioned in parallel with the countershafts w_v1, w_v2. The intermediate gear wheel ZR also meshes with the idler gear wheel 7 on the first countershaft w_v1.

In this example, a dual action coupling device B, C; E, F is positioned between the second dual gear plane 6-9 and the third dual gear plane 7-10, two single action coupling devices can be provided instead of the dual coupling device B, C: E, F. The idler gear wheel 6 can be connected with the first countershaft w_v1 via the coupling device B, and the idler gear wheel 7 can be connected with the first countershaft w_v1 via the coupling device C. The idler gear wheel 9 can be connected with the second countershaft w_v2 via the coupling device E, and the idler gear wheel 10 can be connected with the second countershaft w_v2 via the coupling device F.

To enable the connection of the idler gear wheel 5 with the first countershaft w_v1, a single action coupling device A, is assigned to the first dual gear plane 5-8. In addition, a single action coupling device D is assigned to the first dual gear plane 5-8, to connect the idler gear wheel 8 with the second countershaft w_v2.

In the inventive double clutch transmission, an integrated output stage is provided via the output gear wheel 12 and the output gear wheel 13, with the output gear wheel 12 and the output gear wheel 13 each meshing with a fixed gear wheel 11 on the output shaft w_ab. In the first, second, and third embodiments, in accordance with FIGS. 1, 3 and 5, the output gear wheel 12 is shiftable coupled with the first countershaft w_v, via the coupling device S_ab1, in contrary, the output gear wheel 13 is connected in a rotationally fixed manner with the second countershaft w_v2. In the fourth embodiment, in accordance with FIG. 7, the output gear wheel 12 is connected in a rotationally fixed manner on the first countershaft w_v1, and the output gear wheel 13 is shiftably coupled with the second countershaft w_v2, via the coupling device S_ab2.

Regardless of the respective embodiment, the gear wheels steps i_4 and i_6 of the power shiftable forward gears G4 and G6 are positioned in a gear plane as a dual gear plane 6-9. In addition, the gear wheel steps i_2 and i_R, of the power shift, second forward gear G2 and the reverse gear R, are positioned in a gear plane as a dual gear plane 7-10. The gear wheel steps i_3 and i_5 of the power shift forward gears G3 and G5, are positioned in a gear plane as a dual gear plane 5-8. In this inventive dual clutch transmission, the first and the highest forward gear, and a reverse gear are shifted as a winding-path gear. Also, the first power shiftable forward gear is a winding-path gear.

The table, presented in FIG. 2, shows an example shifting scheme for the first embodiment of the 7-gear double clutch transmission.

It can be seen from the shifting scheme, that, the first forward gear G1 is shifted via the second clutch K2, via the activated coupling device A, via the activated coupling device C, and via the coupling device E, as well as via the disengaged coupling device S_ab1 as a winding-path gear, the second forward gear G2 can be shifted via the first clutch K1 and via the activated coupling device E, and via the engaged coupling device S_ab1, the third forward gear G3 can be shifted via the second clutch K2 and via the activated coupling device, and via the engaged coupling device S_ab1, the fourth forward gear G4 can be shifted via the first clutch K1 and via the activated coupling device C, and the engaged coupling device S_ab1, the fifth forward gear G5 can be shifted via the second clutch K2 and via the activated coupling device D, and the engaged coupling device S_ab1, the sixth forward gear G6 can be shifted via the first clutch K1 and the activated coupling device F, as well as via an engaged coupling device S_ab1, and the seventh forward gear G7 can be shifted via the first clutch K1, via the activated coupling device A, via the activated coupling device C, via the activated coupling device D, and via the disengaged coupling device S_ab1 as a winding-path gear.

It can be seen from the shifting scheme in accordance with FIG. 2, in regard to the possible reverse gear configurations, that a reverse gear R1 can be shifted via the first clutch K1 and via the activated coupling device B and via the engaged coupling device S_ab1. It is possible that an additional reverse gear R2 is shifted via the second clutch K2, via the activated coupling device B, via the activated coupling device D, via the activated coupling device F, and via the engaged coupling device S_ab1 and a disengaged coupling device S_ab2, assigned to the output gear wheel 13, as a winding-path gear.

The shifting scheme of the first embodiment, in accordance with FIGS. 1 and 2, also shows that a low speed gear C1 can be shifted via the first clutch K1, via the activated coupling device A, and via the engaged coupling device S_ab1, and via an additional shifting device K as a winding-path gear, which connects on the second countershaft w_v2 the idler gear wheel 8 of the second partial transmission with the idler gear wheel 9 of the first partial transmission. Furthermore, an overdrive gear O1 is shifted via the second clutch K2, via the activated coupling device C, and the engaged coupling device S_ab1, via the additional, engaged shifting device K as a winding-path gear.

The shifting scheme in accordance with FIG. 2 shows in particular, that, in the first forward gear G1, starting at the second clutch K2, the gear wheels steps i_3, i_4, and i_2 are used, which enables the possibility of coupling the two partial transmissions via the non-engaged coupling device S_ab1. In the second forward gear G2, only the gear wheel step i_2, and the third forward gear G3, the gear wheel step i_3, in the fourth forward gear G4, the gear wheel step i_4, in the fifth forward gear G5, the gear wheel step i_5, and in the sixth forward gear G6, the gear wheel step i_6 is used. In the seventh forward gear G7, the gear wheel steps i_4, i_3, and i_5 are used, which enables the coupling of the two partial transmissions via the disengaged coupling device S_ab1. In the reverse gear R1, only the gear wheel step i_R, in the second dual gear plane 6-9, is used and the additional, possible reverse gear R2, as a winding-path gear, starting at the second clutch K2, uses the gear wheels steps i_5, i_6, and i_R, which it enables the possibility of coupling the two partial transmissions via a disengaged coupling device S_ab2, which is assigned to the output gear wheel 13 on the second countershaft. Also in the low speed gear C1, starting from the first clutch K1, the gear wheel steps i_2, i_5, and i_3 are used, and the two partial transmissions are coupled via the shifting device K on the second countershaft w_v2. In the overdrive gear O1, starting at the second clutch K2, the gear wheels steps i_5, i_2, and i_4 are used, and the two partial transmissions are coupled via the shifting device K.

Thus, only three shifting points exist on the second countershaft w_v2 in the first embodiment.

The table in FIG. 4 presents a shifting scheme for the second embodiment of the 7-gear double clutch transmission in accordance with FIG. 3.

It can be seen from the shifting scheme, that the first forward gear G1 can be shifted via the second clutch K2, via the activated coupling device A, via the activated coupling device C, via the activated coupling device E, and via a disengaged coupling device S_ab1 as a winding-path gear, the second forward gear G2 can be shifted via the first clutch K1 and via the activated coupling device E, the third forward gear G3 can be shifted via the second clutch K2, via the activated coupling device A, and via the engaged coupling device S_ab1, the fourth forward gear G4 can be shifted via the first clutch K1, via the activated coupling device C, and via the engaged coupling device S_ab1, the fifth forward gear G5 can be shifted via the second clutch K2 and via the activated coupling device D, the sixth forward gear G6 can be shifted via the first clutch K1 and via the activated coupling device F, and the seventh forward gear G7 can be shifted via the second clutch K2, via the activated coupling device C, via the engaged shifting device K, and via the engaged coupling device S_ab1 as a winding-path gear.

In regard to the possible reverse gear combinations, it can be seen from the shifting scheme in accordance with FIG. 4, that a reverse gear R1 can be shifted via the first clutch K1, via the activated coupling device B and via the engaged coupling device S_ab1. It is possible, that an additional reverse gear R2 can be shifted via the second clutch K2, via the activated coupling device B, via the activated coupling device D, via the activated coupling device F, via the engaged coupling device S_ab1, and also as a winding-path gear with an additional, disengaged coupling device S_ab2, assigned to the output gear wheel 13, whereby the coupling device S_ab2, in a disengaged condition, disconnects the output gear wheel 13 from the second countershaft w_v2.

In addition, it can be seen in the shifting scheme according to FIG. 4, that a low speed gear C1 can be shifted via the first clutch K1, via the activated coupling device A, and via the engaged shifting device K, via the engaged coupling device S_ab1 as a winding-path gear.

In particular, it can be seen from the shifting scheme in accordance with FIG. 4, that, in the first forward gear G1, starting with the second clutch K2, the gear wheels steps i_3, i_4, and i_2 are used, which enables the coupling of the two partial transmissions via the disengaged coupling device S_ab1. In the second forward gear G2, only the gear wheel step i_2, in the third forward gear G3, the gear wheel step i_3, in the fourth forward gear G4, the gear wheel step i_4, in the fifth forward gear G5, the gear wheel step i_5, and in the sixth forward gear G6, the gear wheel step i_6 is used. In the seventh forward gear G7, the gear wheel steps i_5, i_2, and i_4 are used, whereby the two partial transmissions are coupled via the shifting device K. In the reverse gear R1, only the gear wheel step i_R in the second dual gear plane 6-9 is used, the additional, possible reverse gear R2, as a winding-path gear, starting from the second clutch K2, uses the gear wheel steps i_5, i_6, and i_R, which enables coupling of the two partial transmissions via a disengaged coupling device S_ab2, which is assigned to the output gear wheel 13 on the second countershaft. Furthermore, in the low speed gear C1, starting from the first clutch K1, the gear wheel steps i_2, i_5, and i_3 are used and the two partial transmissions are coupled via the shifting device K on the second countershaft w_v2.

In the second embodiment, the seventh forward gear G7 and the low speed gear C1, are realized as winding-path gears, by the shifting device K, and, in each case, just two devices have to be activated.

An exemplary shifting scheme can be seen in the table of FIG. 6 for the third embodiment of the 7-gear double clutch transmission in accordance with FIG. 5.

It can be seen from the shift scheme, that the first forward gear G1 can be shifted via the second clutch K2, via the activated coupling device F, via the engaged shifting device K, and via the engaged coupling device S_ab1 as a winding-path gear, the second forward gear G2 can be shifted via the of first clutch K1 and via the activated coupling device F, and the engaged coupling device S_ab1, the third forward gear G3 can be shifted via the second clutch K2, via the activated coupling device D, via the engaged coupling device S_ab1, the fourth forward gear G4 can be shifted via the first clutch K1, via the activated coupling device E, and via the engaged coupling device S_ab1, the fifth forward gear G5 can be shifted via the second clutch K2, via the activated coupling device A and via the engaged coupling device S_ab1, the sixth forward gear G6 can be shifted via the first clutch K1 and via the activated coupling device B, the seventh forward gear G7 can be shifted via the first clutch K1, via the activated coupling device A, via the engaged coupling device S_ab1 and via the engaged shifting device K as a winding-path gear.

It can also be seen from the shifting scheme, in accordance with FIG. 6, that a reverse gear R1 can be shifted via the first clutch K1, via the activated coupling device A, via the activated coupling device C, via the activated coupling device D and a winding-path gear with a disengaged coupling device S_ab1. It is possible, that an overdrive gear O1 can be shifted via the second clutch K2, via the activated coupling device B, via the activated coupling device D, via the activated coupling device F as a winding-path gear, with an additional, disengaged coupling device S_ab2, assigned to the output gear wheel 13.

In accordance with FIG. 6, it can be seen from the shifting scheme that, in the first forward gear G1, starting with the second clutch K2, the gear wheel steps i_3, i_4, and i_2 are used, and the two partial transmissions can be coupled with each other via the shifting device K. In the second forward gear, G2, only the gear wheel step i_2 is used, in the third forward gear G3, the gear wheel step i_3, in the fourth forward gear G4, the gear wheel step i_4, in the fifth forward gear G5, the gear wheel step i_5, and in the sixth forward gear G6, the gear wheel step i_6 is used. In the seventh forward gear G7, the gear wheel steps i_4, i_3, and i_5 are used and the two partial transmissions can be coupled via the shifting device K. In the reverse gear R1, as a winding-path gear, starting from the first clutch K1, the gear wheel steps i_R, i_5, and i_3 are used, which enables coupling the two partial transmissions via a disengaged coupling device S_ab1, which is assigned to the output gear wheel 12 on the first countershaft w_v1. Furthermore, in the overdrive gear O1, starting from the second clutch K2, the gear wheel steps i_3, i_2, and i_6 are used, which enables coupling of the two partial transmissions via a disengaged coupling device S_ab2, which is assigned to the output gear wheel 13 on the second countershaft w_v2.

In the third embodiment, the gear wheel steps i_2, i_3, and i_4 are positioned on the second countershaft w_v2, enabling advantages in the gearing configuration and with regard to the bearing of the shaft and the shaft design.

Figure 8:
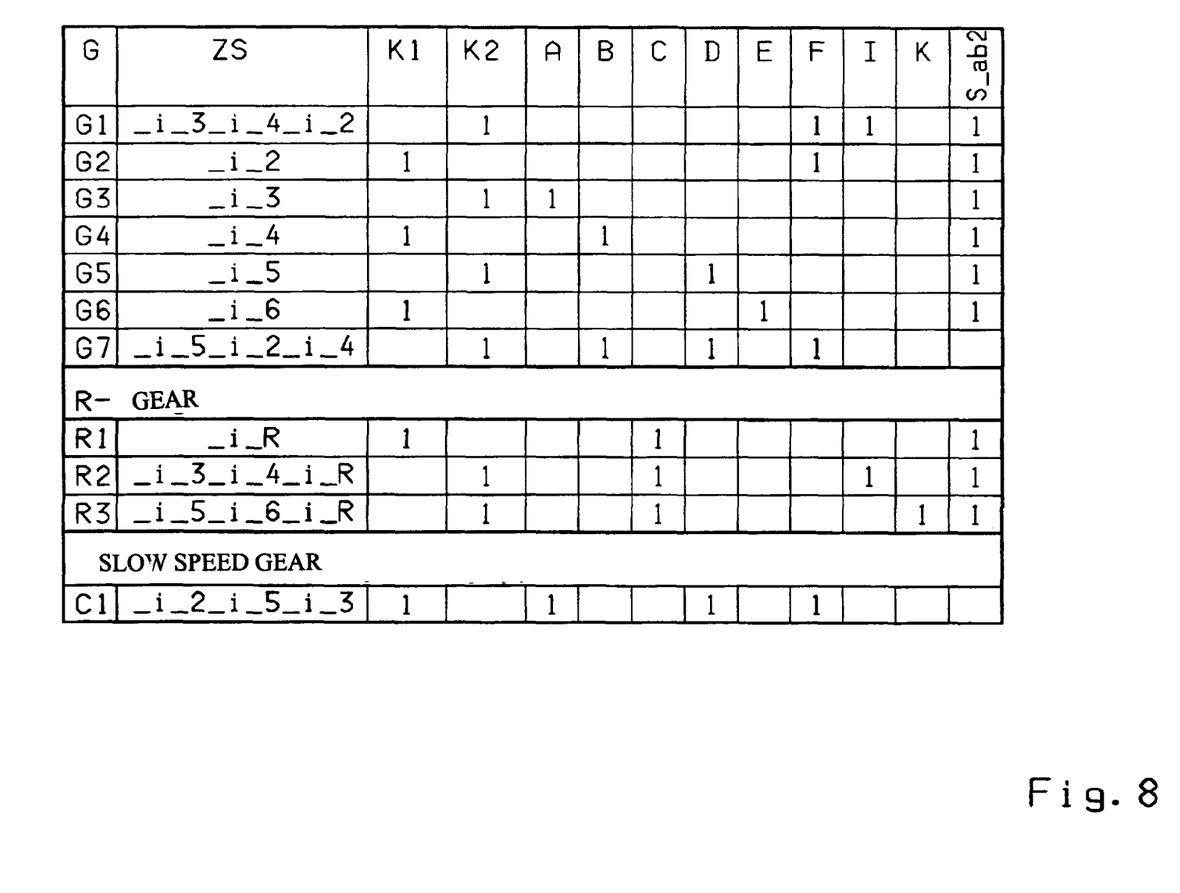
FIG. 8 a shift scheme of the fourth embodiment in accordance with FIG. 7.

The table in FIG. 8 presents an example shifting scheme for the fourth embodiment of the 7-gear double clutch transmission, in accordance with FIG. 7.

It can be seen from the shifting scheme that the first forward gear G1 can be shifted via the second clutch K2, via the activated coupling device F, via the engaged shifting device I and via the engaged coupling device S_ab2 as a winding-path gear, the second forward gear G2 can be shifted via the first clutch K1, via the activated coupling device F, and via the engaged coupling device S_ab2, the third forward gear G3 can be shifted via the second clutch K2, via the activated coupling device A, and via the engaged coupling device S_ab2, the fourth forward gear G4 can be shifted via the first clutch K1, via the activated coupling device B, and via the engaged coupling device S_ab2, the fifth forward gear G5 can be shifted via the second clutch K2, via the activated coupling device D, and via the engaged coupling device S_ab2, the sixth forward gear G6 can be shifted via the first clutch K1, via the activated coupling device E, and via the engaged coupling device S_ab2, and the seventh forward gear G7 can be shifted via the second clutch K2, via the activated coupling device B, via the activated coupling device D, via the activated coupling device F, as a winding-path gear with an engaged coupling device S_ab2.

In regard to the reverse gear ratios, it can be seen from the shifting schemes in accordance with FIG. 8, that a reverse gear R1 can be shifted via the first clutch K1, via the activated coupling device C, and via the engaged coupling device S_ab2, and an additional reverse gear R2 can be shifted via the second clutch K2, via the activated coupling device C, via the engaged shifting device I, and via the engaged coupling device S_ab2 as a winding-path gear. It is possible, that an additional reverse gear R3 can be shifted via the second clutch K2, via the activated coupling device C, via the engaged shifting device K, and via the engaged coupling device S_ab2 as a winding-path gear.

Also, the shifting scheme in the fourth embodiment shows that a low speed gear C1 can be shifted via the first clutch K1, via the activated coupling device A, via the activated coupling device D, and via the activated coupling device F, a winding-path gear with a disengaged coupling device S_ab2.

This shifting scheme in accordance with FIG. 8 shows in particular that, in the forward gear G1, starting from the second clutch K2, the gear wheel steps i_3, i_4, and i_2 are used, the two partial transmissions are coupled via the shifting device I. In the second forward gear G2, only the gear wheel step i_2 is used, in the third forward gear G3, the gear wheel step i_3, in the fourth forward gear G4, the gear wheel step i_4, in the fifth forward gear G5, the gear wheel step i_5, and in the sixth forward gear G6 the gear wheel step i_6 is used. In the seventh forward gear G7, the gear wheel steps i_5, i_2, and i_4 are applied, whereby coupling the two partial transmissions is realized via a disengaged coupling device S_ab2, which is assigned to the output gear wheel 13 on the second countershaft w_v2. In the reverse gear R1, as a winding-path gear, starting from the first clutch K1, only the gear wheel step i_R is used. In and additional reverse gear R2, starting from the second clutch K2, the gear wheel steps i_3, i_4, and i_R are used, and the two partial transmissions are coupled with each other via the engaged shifting device I. In the next reverse gear R3, starting from the second clutch K2, the gear wheel steps i_5, i_6, and i_R are used, and the two partial transmissions are coupled with each other via the engaged shifting device K. In addition, in the low speed gear C1, starting from the first clutch K1, the gear wheel steps i_2, i_5, and i_3 are used, whereby coupling the two partial transmissions is realized via a disengaged coupling device S_ab2, which is assigned to the output gear wheel 13 on the second countershaft w_v2.

In the fourth embodiment, the first forward gear G1 and alternative reverse gear are each engaged, as winding-path gears, with the shifting device I.

Independent from the respective embodiment, if the low speed gear C1 and/or the overdrive gear O1 and/or one of the reverse gears R2/R3 are not used, decoupling of the output gear wheel 12 or 13 from the countershaft w_v1 or w_v2 is not required, and therefore, there is no need for the coupling device S_ab1 or S_ab2 to shift the gears, which do not require a coupling device. However, if the use of the coupling device S_ab1 or S_ab2 is required to shift certain gears, the coupling device S_ab1 or S_ab2 should be engaged during the shifting of other gears, whereby the coupling device S_ab1 or S_ab2 is not required.

Independent from the respective embodiment, if the low speed gear C1 and/or the overdrive gear O1 and/or one of the reverse gears R2, R3 are not used, a rotationally fixed connection of the respective gear wheels via the engaged shifting device K or I is not required and therefore, the shifting device K or I can be omitted for the shifting of the gears, which do not require the shifting device K or I. However, if the use of the shifting devices K or I is required for the shifting of certain gears, in that case the shifting device K or I should be disengaged, when shifting the other gears, in which the shifting device K or I is not required.

Independent from the respective embodiment, both partial transmissions are used in the highest forward gear G7, and at least in one reverse gear, as they are winding-path gears. The first power shift forward gear G1 is a winding-path gear. Furthermore, the gear wheel steps i_4 and i_6 of the power shift forward gears G4 and G6 are positioned together in the second dual gear plane 6-9 in the third and fourth embodiments, and are positioned in the third dual gear plane 7-10 in the first and in the second embodiment. Also, the gear wheel steps i_3 and i_5 of the power shift forward gears G3 and G5 are positioned together in the first dual gear plane 5-8. The gear wheel steps i_2 and i_R of the power shift second forward gear G2 and a reverse gear R are positioned together in the third dual gear plane 7-10 in the third and fourth embodiment, or in the second dual gear plane 6-9 in the first and second embodiment.

In summary, in the first embodiment in accordance with FIGS. 1 and 2, it is shown that, in the first dual gear plane 5-8, the idler gear wheel 5 can be used for the four forward gears G1, G3, G7, C1, and that the idler gear wheel 8 can be used for four forward gears G5, G7, C1, O1 and one reverse gear R2. In the second dual gear plane 6-9, the idler gear wheel 6 can be used for two reverse gears R1 and R2, and the idler gear wheel 9 for four forward gears G1, G2, C1, O1 and finally, in the third dual gear plane 7-10, the idler gear wheel 7 can be used for four forward gears G1, G4, G7, O1, and the idler gear wheel 10 can be used for one reverse gear and for one forward gear G6.

In the second embodiment, in accordance with FIGS. 3 and 4, in the first dual gear plane 5-8, the idler gear wheel 5 can be used for three forward gears G1, G3, C1, and the idler gear wheel 8 can be used for three forward gears G5, G7, C1 and one reverse gear R2. In the second dual gear plane 6-9, the idler gear wheel 6 can be used for the two reverse gears R1, R2, and the idler gear wheel 9 can be used for four forward gears G1, G2, G7, C1. Finally, in the third gear plane 7-10, the idler gear wheel 7 can be used for three forward gears G1, G4, G7, and the idler gear wheel 10 can be used for one forward gear G6 and one reverse gear R2.

In the third embodiment, in accordance with FIGS. 5 and 6, in first dual gear plane 5-8, the idler gear wheel 5 can be used for two forward gears G5, G7 and one reverse gear R1, and the idler gear wheel 8 can be used for four forward gears G1, G3, G7, O1 and for one reverse gear R1. In the second dual gear plane 6-9, the idler gear wheel 6 can be used for two forward gears G6, O1, and the idler gear wheel 9 can be used for three forward gears G1, G4, G7. Finally, in the third dual gear plane 7-10, the idler gear wheel 7 can be used for one reverse gear R1, and the idler gear wheel 10 can be used for three forward gears G1, G2, O1.

In the fourth embodiment, in accordance with FIGS. 7 and 8, in the first dual gear plane 5-8, the idler gear wheel 5 can be used for three forward gears G1, G3, C1 and one reverse gear R2, and the idler gear wheel 8 can be used for three forward gears G5, G7, C1 and one reverse gear R3. In the second dual gear plane 6-9, the idler gear wheel 6 can be used for three forward gears G1, G4, G7, and one reverse gear R2, and the idler gear wheel 9 can be used for one forward gear G6 and 1 reverse gear R3. Finally, in the third dual gear plane 7-10, the idler gear wheel 7 can be used for three reverse gears R1, R2, R3, and the idler gear wheel 10 can be used for four forward gears G1, G4, G7, C1.

In all embodiments of the double clutch transmission and due to the provided multiple use of certain idler gear wheels, less gear planes are required and therefore less parts, while still maintaining the same amount of gears, thus resulting in an advantageous space saving construction and a cost reduction.

Independent from the respective embodiment, the numeral "1" in a box of the respective table of the shift schemes, in accordance with FIGS. 2, 4, 6, and 8, means that the associated clutch K1, K2, or the associated coupling devices A, B, C, D, E, F or the associated shifting devices K, I are engaged. In contrast, an empty box in the respective table of the shift schemes, in accordance with FIGS. 2, 4, 6, and 8, means that the associated clutch K1, K2, or the associated coupling device A, B, C, D, E, F or the associated shifting device K, I are each disengaged.

Deviating from the previously mentioned rules, it applies for the coupling device S_ab1, or S_ab2 assigned to a drive gear wheel 12, 13 that the coupling device S_ab1, or S_ab2 in case of an empty box in the associated table of the shift schemes, must be disengaged but that, a box having the numeral "1", depending on the gear in a first group of gears, the coupling device S_ab1, or S_ab2 must be engaged, and in a second group of gears, the coupling device S_ab1, or S_ab2 can be disengaged or engaged. In addition, it is possible to add additional coupling devices or shifting devices, without affecting the flow of force. A gear pre-selection is hereby enabled.

REFERENCE CHARACTERS

1 Fixed Wheel on the second transmission input shaft
2 Fixed Wheel on the first transmission input shaft
3 Fixed Wheel on the first transmission input shaft
5 Idler gear wheel on the first countershaft
6 Idler gear wheel on the first countershaft
7 Idler gear wheel on the first countershaft
8 Idler gear wheel on the second countershaft
9 Idler gear wheel on the second countershaft
10 Idler gear wheel on the second countershaft
K1 first clutch
K2 second clutch
w_an Drive Shaft
w_ab Output Shaft
w_v1 first Countershaft
w_v2 second Countershaft
A Coupling Device
B Coupling Device
C Coupling Device
D Coupling Device
E Coupling Device
F Coupling Device
i_1 Gear Wheel Step, first forward gear
i_2 Gear Wheel Step, second forward gear
i_3 Gear Wheel Step, third forward gear
i_4 Gear Wheel Step, fourth forward gear
i_5 Gear Wheel Step, fifth forward gear
i_6 Gear Wheel Step, sixth forward gear
G1 First forward gear
G2 Second forward gear
G3 Third forward gear
G4 Fourth forward gear
G5 Fifth forward gear
G6 Sixth forward gear
G7 Seventh forward gear
C1 Low Speed Gear
O1 Overdrive Gear
R1 Reverse Gear
R2 Reverse Gear
R3 Reverse Gear
w_zw Intermediate Shaft
ZR Intermediate Gear
11 Fixed gear wheel of the Drive Shaft
12 Drive Gear Wheel of the first Countershaft 13 Drive Gear Wheel of the second Countershaft
14 Torsion Vibration Damper
ZS Gear Wheel Step in use
S_ab1 Coupling Device, optional
S_ab2 Coupling Device, optional
K Shifting device
I Shifting device

The invention claimed is:

1. A double clutch transmission comprising:
   first and second clutches (K1, K2) each comprising an input side connected to a drive shaft (w_an) and an output side connected to one of a first and a second transmission input shaft (w_K1, w_K2) arranged coaxially with one another;
   at least first and second countershafts (w_v1, w_v2) rotatably supporting a plurality of idler gear wheels (5, 6, 7, 8, 9, 10);
   a plurality of fixed gear wheels (1, 2, 3) being connected in a rotationally fixed manner to one of the first and second transmission input shafts (w_K1, w_K2) and each of the plurality of fixed gear wheels (1, 2, 3) engaging at least some of the idler gear wheels (5, 6, 7, 8, 9, 10);
   a plurality of coupling devices (A, B, C, D, E, F) for coupling one of the idler gear wheels (5, 6, 7, 8, 9, 10) in a rotationally fixed manner to one of the first and the second countershafts (w_v1, w_v2);
   first and second drive output gear wheels (12, 13) being respectively supported on one of the first and the second countershafts (w_v1, w_v2) and engaging gearing of an output shaft (w_ab);
   a shifting device (I, K) for coupling two of the gear wheels such that a plurality of power shift forward drive gears (1, 2, 3, 4, 5, 6) and at least one reverse drive gear (R1, R2, R3) being engagable;
   first, second and third dual gear planes (5-8, 6-9, 7-10) each comprising an idler gear wheel (5, 8; 6, 9; 7, 10) on each of the first and the second countershafts (w_v1, w_v2) and a fixed gear wheel (1, 2, 3) on one of the first and the second transmission input shafts (w_K1, w_K2) such that, in each of the first, the second and the third dual gear planes (5-8, 6-9, 7-10) at least one of the idler gear wheels (5, 6, 7, 8, 9, 10) is utilized for engaging at least two gears, such that at least one winding-path gear is engagable, via the shifting device (I, K) by disengagement of an output coupling device (S_ab1, S_ab2) associated with one of the first and the second drive output gear wheels (12, 13).

2. The double clutch transmission according to claim 1, wherein the output coupling device (S_ab1, S_ab2) is associated with the first drive output gear wheels (12, 13) on the first countershaft (w_v1), and a first forward gear (G1) is shifted as a first one of the at least one winding-path gear by disengagement of the output coupling device (S_ab1) on the first countershaft (w_v1) to decouple the first output gear wheel (12) from the first countershaft (w_v1), and a seventh forward gear (G7) is engaged as a second one of the at least one winding-path gear by disengagement of the output coupling device (S_ab1) on the first countershaft (w_v1) to decouple the first output gear wheel (12) from the first countershaft (w_v1).

3. The double clutch transmission according to claim 1, wherein the shifting device (K) is on the second countershaft (w_v2), the output coupling device (S_ab1, S_ab2) is associated with the first drive output gear, a first forward gear (G1) is engaged as a first one of the at least one winding-path gear by disengagement of the output coupling device (S_ab1) on the first countershaft (w_v1) to decouple the first output gear wheel (12) from the first countershaft (w_v1), an idler gear wheel (8) of a second partial transmission is connectable, via the shifting device (K) on the second countershaft (w_v2), to an idler gear wheel (9) of a first partial transmission such that a seventh forward gear (G7) is engaged as a second one of the at least one winding-path gear via the shifting device (K) on the second countershaft (w_v2).

4. The double clutch transmission according to claim 1, wherein the shifting device (K) is on the second countershaft (w_v2), an idler gear wheel (8) of the second partial transmission is connectable, via the shifting device (K) on the second countershaft (w_v2), to an idler gear wheel (9) of a first partial transmission such that a first forward gear (G1) is engaged as a first one of the at least one winding-path gear via the shifting device (K) on the second countershaft (w_v2) and a seventh forward gear (G7) is engaged as a second one of the at least one winding-path gear via the shifting device (K) on the second countershaft (w_v2).

5. The double clutch transmission according to claim 4, wherein the output coupling device (S_ab1, S_ab2) is associated with the first drive output gear wheels (12, 13) on the first countershaft (w_v1), and a reverse gear (R1) is engaged as a third one of the at least one winding-path gear by disengagement of the output coupling device (S_ab1) on the first countershaft (w_v1) which decouples the first output gear wheel (12) from the first countershaft (w_v1).

6. The double clutch transmission according to claim 1, wherein the shifting device (L) is on the first countershaft (w_v1), an idler gear wheel (5) of the second partial transmission is connectable, via the shifting device (I) on the first countershaft (w_v1), to an idler gear wheel (6) of the first partial transmission such that a first forward gear (G1) is engaged as a first one of the at least one winding-path pear via the shifting device (I) on the first countershaft (w_v1) and a reverse gear (R2) is engaged as a second one of the at least one winding-path gear via the shifting device (I) on the first countershaft (w_v1).

7. The double clutch transmission according to claim 1, wherein the output coupling device (S_ab2) is associated with the second drive output gear wheel (13) on the second countershaft (w_v2), and a seventh forward gear (G7) is engaged as the at least one winding-path gear by disengagement of the output coupling device (S_ab2) of the second countershaft (w_v2) which decouples the second output gear wheel (13) from the second countershaft (w_v2).

8. The double clutch transmission according to claim 1, wherein the first dual gear plane (5-8) comprises a fixed gear wheel (1) on the second transmission input shaft (w_K2) of a second partial transmission and the second and the third dual gear planes (6-9, 7-10) each comprise one fixed gear wheel (2, 3) on the first transmission input shaft (w_K1) of a first partial transmission.

9. The double clutch transmission according to claim 1, wherein:
   a first forward gear (G1) is engaged as a first one of the at least one winding-path gear by engagement of the second clutch (K2), a first coupling device (A), a second coupling device (C), and a fourth coupling device (E), and disengagement of the output coupling device (S_ab1);
   a second forward gear (G2) is engaged by engagement of the first clutch (K1) and via the fourth coupling device (E);
   a third forward gear (G3) is engaged by engagement of the second clutch (K2) and the first coupling device (A) as well as engagement of the output coupling device (S_ab1);

a fourth forward gear (G4) is engaged by engagement of the first clutch (K1), the second coupling device (C) and the output coupling device (S_ab1);

a fifth forward gear (G5) is engaged by engagement of the second clutch (K2) and a third coupling device (D);

a sixth forward gear (G6) is engaged by engagement of the first clutch (K1) and a fifth coupling device (F); and a seventh forward gear (G7) is engaged as a second one of the at least one winding path gear by engagement of the first clutch (K1), the first coupling device (A), the second coupling device (C) and the third coupling device (D) and disengagement of the output coupling device (S_ab1).

10. The double clutch transmission according to claim 9, wherein a reverse gear (R1) is engaged by engagement of the first clutch (K1), a sixth coupling device (B) and the output coupling device (S_ab1).

11. The double clutch transmission according to claim 9, wherein a reverse gear (R2) is engaged as a third one of the at least one winding-path gear by engagement of the second clutch (K2), a sixth coupling device (B), the third coupling device (D), the fifth coupling device (F), and the output coupling device (S_ab1) and disengagement of an additional output coupling device (S_ab2) associated with the second output gear wheel (13).

12. The double clutch transmission according to claim 9, wherein a low speed gear (C1) is engaged as a third one of the at least one winding-path gear by engagement of the first clutch (K1), the first coupling device (A) and the output coupling device (S_ab1) and engagement of the shifting device (K) which couples an idler gear wheel (8) of a second partial transmission with an idler gear wheel (9) of a first partial transmission.

13. The double clutch transmission according to claim 9, wherein an overdrive gear (O1) is engaged as a third one of the at least one winding-path gear by engagement of the second clutch (K2), the second coupling device (C), the output coupling device (S_ab1), and the shifting device (K) which connects an idler gear wheel (8) of a second countershaft (w_v2) with an idler gear wheel (9) of a first partial transmission.

14. The double clutch transmission according to claim 1, wherein:

a first forward gear (G1) is engaged as a first one of the at least one winding gear by engagement of the second clutch (K2), a first coupling device (A), a second coupling device (C) and a fourth coupling device (E) and disengagement of the output coupling device (S_ab1);

a second forward gear (G2) is engaged by engagement of the first clutch (K1) and the fourth coupling device (E) and the output coupling device (S_ab1);

a third forward gear (G3) is engaged by engagement of the second clutch (K2), the first coupling device (A) and the output coupling device (S_ab1);

a fourth forward gear (G4) is engaged by engagement of the first clutch (K1), the second coupling device (C) and the output coupling device (S_ab1);

a fifth forward gear (G5) is engaged by engagement of the second clutch (K2) and a third coupling device (D) and the output coupling device (S_ab1);

a sixth forward gear (G6) is engaged by engagement of the first clutch (K1) and the fifth coupling device (F) and the output coupling device (S_ab1); and a seventh forward gear (G7) is engaged as a second one of the at least one winding-path gear by engagement of the second clutch (K2), the activated coupling device (C), the coupling device (K) and the output coupling device (S_ab1).

15. The double clutch transmission according to claim 14, wherein a reverse gear (R1) is engaged by engagement of the first clutch (K1), a sixth coupling device (B) and the output coupling device (S_ab1).

16. The double clutch transmission according to claim 14, wherein a reverse gear (R2) is engaged as a third one of the at least one winding-path gear by engagement of the second clutch (K2), the sixth coupling device (B), the third coupling device (D), the fifth coupling device (F) and the output coupling device (S_ab1) as well as disengagement of another output coupling device (S_ab2) associated with the second output gear wheel (13).

17. The double clutch transmission according to claim 14, wherein a low speed gear (C1) is engaged as a third one of the at least one winding-path gear by engagement of the first clutch (K1), the first coupling device (A), the shifting device (K) and the output coupling device (S_ab1).

18. The double clutch transmission according to claim 1, wherein a first forward gear (G1) is engaged a first one of the at least one winding-path gear by engagement of the second clutch (K2), the fifth coupling device (F), the shifting device (K) and the output coupling device (S_ab1);

a second forward gear (G2) is engaged by engagement of the first clutch (K1), the fifth coupling device (F) and the output coupling device (S_ab1);

a third forward gear (G3) is engaged by engagement of the second clutch (K2), a third coupling device (D) and the output coupling device (S_ab1);

a fourth forward gear (G4) is engaged by engagement of the first clutch (K1), a fourth coupling device (E) and the output coupling device (S_ab1);

a fifth forward gear (G5) is engaged by engagement of the second clutch (K2), the first coupling device (A) and the output coupling device (S_ab1);

a sixth forward gear (G6) is engaged by engagement of the first clutch (K1) and a second coupling device (B); and a seventh forward gear (G7) is engaged as a second one of the at least one winding-path gear by engagement of the first clutch (K1), the first coupling device (A), the output coupling device (S_ab1) and the shifting device (K).

19. The double clutch transmission according to claim 18, wherein a reverse gear (R1) is engaged as a third one of the at least one winding-path gear by engagement of the first clutch (K1), the first coupling device (A), the sixth coupling device (C) and the third coupling device (D) and disengagement of the output coupling device (S_ab1).

20. The double clutch transmission according to claim 18, wherein an overdrive gear (O1) is engaged as a third one of the at least one winding-path gear by engagement of the second clutch (K2), the second coupling device (B), the third coupling device (D) and the fifth coupling device (F) and disengagement of an additional output coupling device (S_ab2) associated with the second output gear wheel (13).

21. The double clutch transmission according to claim 1, wherein;

a first forward gear (G1) is engaged as a first one of the at least one winding-path gear by engagement of the second clutch (K2), the fifth coupling device (F), the shifting device (I) and the output coupling device (S_ab2);

a second forward gear (G2) is engaged by engagement of the first clutch (K1), the fifth coupling device (F) and the output coupling device (S_ab2);

a third forward gear (G3) is engaged by engagement of the second clutch (K2), the first coupling device (A) and the output coupling device (S_ab2);

a fourth forward gear (G4) is engaged by engagement of the first clutch (K1), a second coupling device (B) and the output coupling device (S_ab2);

a fifth forward gear (G5) is engaged by engagement of the second clutch (K2), a third coupling device (D) and the output coupling device (S_ab2);

a sixth forward gear (G6) is engaged by engagement of the first clutch (K1), a fourth coupling device (E) and the output coupling device (S_ab2); and a seventh forward gear (G7) is engaged as a second one of the at least one winding-path gear by engagement of the second clutch (K2), the second coupling device (B), the third coupling device (D) and the fifth coupling device (F) and disengagement of the output coupling device (S_ab2).

22. The double clutch transmission according to claim 21, wherein a reverse gear (R1) is engaged by engagement of the of first clutch (K1), a sixth coupling device (C) and the output coupling device (S_ab2); and an additional reverse gear (R2) is engaged as a third one of the at least one winding-path gear by engagement of the second clutch (K2), the sixth coupling device (C), the shifting device (I) and the output coupling device (S_ab2).

23. The double clutch transmission according to claim 21, wherein a reverse gear (R3) is engaged as a third one of the at least one winding-path gear by engagement of the second clutch (K2), a sixth coupling device (C), the shifting device (K) and the output coupling device (S_ab2).

24. The double clutch transmission according to claim 21, wherein a low speed gear (C1) is engaged as a third one of the at least one winding-path gear by engagement of the first clutch (K1), the first coupling device (A), the third coupling device (D), and the fifth coupling device (F) and disengagement of the output coupling device (S_ab2).

* * * * *